Oct. 6, 1970 H. L. WIRSING 3,532,830

TRUNK PREFERENCE CIRCUIT FOR A COMMUNICATION SWITCHING SYSTEM

Filed July 31, 1968 7 Sheets-Sheet 1

INVENTOR.
HOWARD L. WIRSING

BY Bernard E. Franz

ATTY.

Oct. 6, 1970 H. L. WIRSING 3,532,830

TRUNK PREFERENCE CIRCUIT FOR A COMMUNICATION SWITCHING SYSTEM

Filed July 31, 1968 7 Sheets-Sheet 4

United States Patent Office 3,532,830
Patented Oct. 6, 1970

3,532,830
TRUNK PREFERENCE CIRCUIT FOR A COMMUNICATION SWITCHING SYSTEM
Howard L. Wirsing, Lisle, Ill., assignor to Automatic Electric Laboratories, Inc., Northlake, Ill., a corporation of Delaware
Filed July 31, 1968, Ser. No. 749,131
Int. Cl. H04m *3/22;* H04q *3/64*
U.S. Cl. 179—18 5 Claims

ABSTRACT OF THE DISCLOSURE

A system in which the busy-idle status of trunks is recorded in a memory used by the route selector of the common control equipment. The route selector hunts through the memory to find an idle trunk, writes into the memory to mark the selected trunk busy, and supplies the trunk identity to a marker to establish a connection through the switching network. A trunk scanner periodically examines busy-idle contacts in the trunk circuits, and each one that is marked busy in the memory, and has become idle as indicated by the contacts. is marked "queueing idle" in the memory. The route selector chooses a "true idle" trunk if available in preference to those marked queueing idle. When all of the trunks are marked either busy or queueing idle, the trunk scanner changes the memory marking of all the idle trunks to true idle.

BACKGROUND OF THE INVENTION

Field of the invention

This invention relates to a trunk preference circuit for a communication switching system, and more particularly for a system using electronic common control equipment in which the busy-idle trunk status is recorded in a memory.

Description of the prior art

Typically the terminals of the switching network of a communications exchange are connected to various trunk and junctor circuits. To equalize the wear of the equipment in the circuits and to assure that they are all operating properly, it is desirable to provide for uniform usage thereof. In electromechanical systems each of these network termination circuits applies a busy or idle indicating mark to a test conductor. During the establishment of a connection for a call, a selecting circuit is connected to the test conductors of a group of termination circuits which may be used in the routing of the call, and one circuit of the group is selected. Several such selecting circuits are required when using electromechanical equipment. There are many known grading schemes in which different selecting circuits have a different order of preference for use of the termination circuits, to approach uniform usage.

In systems using an electronic common control equipment, it is possible to provide adequate service with only one selection circuit in a switching office, by storing the busy-idle status of the network termination circuits in a memory, and using a route selector in the common control equipment to hunt for an idle circuit indication stored in the memory. However, with a single selection circuit there is no possibility of using grading schemes, and a straightforward priority sequence in which lower numbered termination circuits when idle are preferred to higher numbered trunks clearly produces a much higher usage of the lower numbered trunks.

It is also known to use a trunk selection chain in which a different trunk circuit is pre-selected as the first choice on successive calls, or to use a truly random selection scheme. However, these schemes do not provide complete assurance that every trunk will be used at least once before repeated selection of any of them. Furthermore the route selection circuits of the common control equipment are most conveniently arranged to step through the addresses of the memory in a fixed sequence.

In systems using a trunk selection circuit in which the busy-idle status is recorded only in memory, being set to the busy status when selected and set to the idle status upon detecting a disconnect signal, it is possible that due to noise or other circumstances a difference may arise between the indication in memory and the actual condition of a trunk circuit. This difficulty may be obviated by using a selection circuit which makes its search from the memory and marks a selected termination circuit to the busy status, and using a separate trunk scanner which periodically examines test conductors physically connected to the trunk circuits to compare the busy-idle indications on the test conductors to the corresponding indications from memory, and upon finding a circuit which is marked busy in memory and is idle on the test conductor, to change the memory indication to idle.

SUMMARY OF THE INVENTION

It is an object of this invention to provide a termination circuit (trunk, junctor, line circuit, and the like) preference and selecting circuit which provides a uniform preference where no specific termination circuits are constantly preferred in contrast to others.

According to the invention, an arrangement is provided wherein the status indications in memory for the termination circuits include a first or "queueing" idle state and a second or "true" idle state, in which a trunk scanner upon finding a termination circuit having a busy status recorded in memeory and an idle status indicated on a test conductor from the termination circuit, writes the first idle status in memory for that termination circuit, and upon completing the scan of a group of termination circuits and finding no circuit having the second idle state, changes all of the memory status indications for the circuits of that group which are in the first idle state to the second idle state. The group selector circuit of the common control equipment in hunting for a termination circuit in a particular group searches first for one having the second idle state.

This arrangement has the advantage that every termination circuit will be selected at least once before any one of the circuits in a group will again be selected. Any termination circuit which is held for a long time on a single call does not become available for use immediately upon becoming idle, but is marked queueing idle, and must wait until all of the other termination circuits which are not busy are used and set to queing idle, and all of the idle circuits of the group are again set to true idle.

BRIEF DESCRIPTION OF THE DRAWINGS

These and other objects and features of the invention may be more readily apprehended from an examination of the following specification, appended claims and attached drawings in which:

DESCRIPTION OF THE PREFERRED EMBODIMENT

Figure 1:
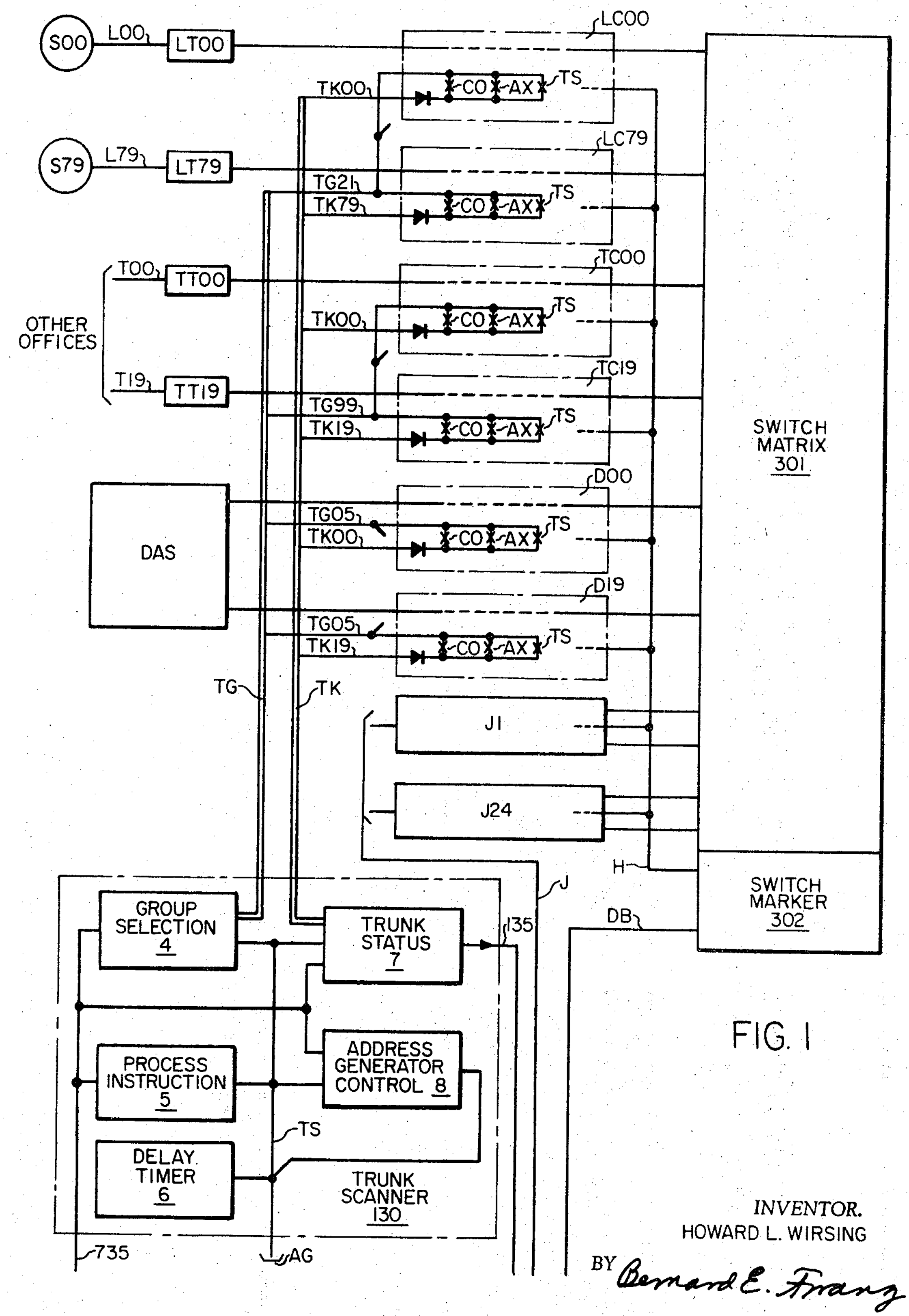
FIGS. 1 and 2, with FIG. 1 placed above FIG. 2, comprise a block and schematic diagram of a switching system.

The digital control and processing circuits include flip-flop and latch bistable storage devices, and various logic gates. Each of the flip-flops includes two transistors in a bistable circuit configuration. Each flip-flop has eight input terminals and two output terminals. To set a flip-flop to state one, producing a true indication, requires coincidence of a signal on a D.C. input and a trigger pulse on an A.C. input; and in like manner to reset it to state zero, indicating a false condition, requires coincidence of a D.C. input and an A.C. input. The flip-flops are shown in the drawings as having the inputs on the left-hand side with one or two small coincidence gates on the upper half to set the flip-flop and one or two similar coincidence gates on the lower half for reset. Each such coincidence gate is shown with the A.C. or trigger pulse input at the center of its left side, and the D.C. or control input at the top or botom. The outputs are shown with the state one output at the top and the state zero output at the bottom on the right-hand side. A latch comprises two NOR gates connected in a feed-back arrangement to form a bistable storage device. It requires only D.C. signals for input, indicated at the left-side by an S near the top for the "set input" and an R near the bottom for the "reset" input, the outputs being at the right like a flip-flop.

Gated pulse amplifiers are shown as triangles with four input leads on the base on the left-hand side and an output at the apex on the right-hand side. The upper input on the left-hand side is a capacitance-coupled trigger-pulse input terminal, and the other three inputs are for D.C. control inputs. The circuit is arranged so that unused D.C. inputs do not have any effect on the operation. If there is a connection shown only to the second input lead the signal thereon when true enables the amplifier to pass the pulse supplied to the upper input. If there are connections to the second and third inputs, they act as an AND circuit so that only when both of these inputs are true is the amplifier enabled to pass the pulse at the upper input. If there is also a connection to the lower input it acts as an OR circuit with the other control inputs so that when it is true it enables the amplifier. If the gated pulse amplifier has a connection only to the upper input then it always passes a pulse supplied thereto.

The logical operations are performed by direct coupled resistance-transistor logic in the form of NOR gates. However, for simplicity of disclosure the gates in the drawings are shown as being either AND gates as indicated by a line across the gate parallel to the base, or as OR gates indicated by a diagonal line.

Typical schematic diagrams of these circuit elements are illustrated in FIG. 78 of U.S. Pat. 3,301,963 to Lee et al.

In this system the true condition of a signal, the one state, is represented by a negative eight-volt potential; while the false condition of a signal, the zero state, is represented by ground potential.

OUTLINE (A) Communication switching system (FIGS. 1 and 2)
  (1) Equipment of the system
  (2) Operation of the system
(B) Memory sections—route selection (C) Trunk scanner
  (1) Equipment of trunk scanner
  (2) Operation of trunk scanner
(D) Translator write
  (1) Equipment of translator write circuit
  (2) Translator write operation

(A) COMMUNICATION SWITCHING SYSTEM (FIGS. 1 AND 2)

The preferred embodiment of the invention is incorporated in the Communication Switching System disclosed in U.S. Pat. No. 3,328,534 to R. J. Murphy et al. issued June 27, 1967. Three copending U.S. applications for a Digital Control and Memory Arrangement, Particularly for a Communication Switching System, S.N. 667,170 by H. L. Wirsing and W. C. Miller filed Sept. 12, 1967; S.N. 690,356 by G. P. Minarcik filed Dec. 13, 1967 and S.N. 690,348 by D. K. K. Lee, J. R. Vande Wege and W. R. Wedmore filed Dec. 13, 1967, disclose an arrangement of the common control equipment into three subsystems sharing a common ferrite core memory. The above patent and the three copending applications are incorporated herein and made a part hereof as though fully set forth. The Murphy et al. patent is hereinafter referred to as the System patent, and the three copending applications are hereinafter referred to as the Memory Sharing applications.

(A1) Equipment of the system

Figure 2:
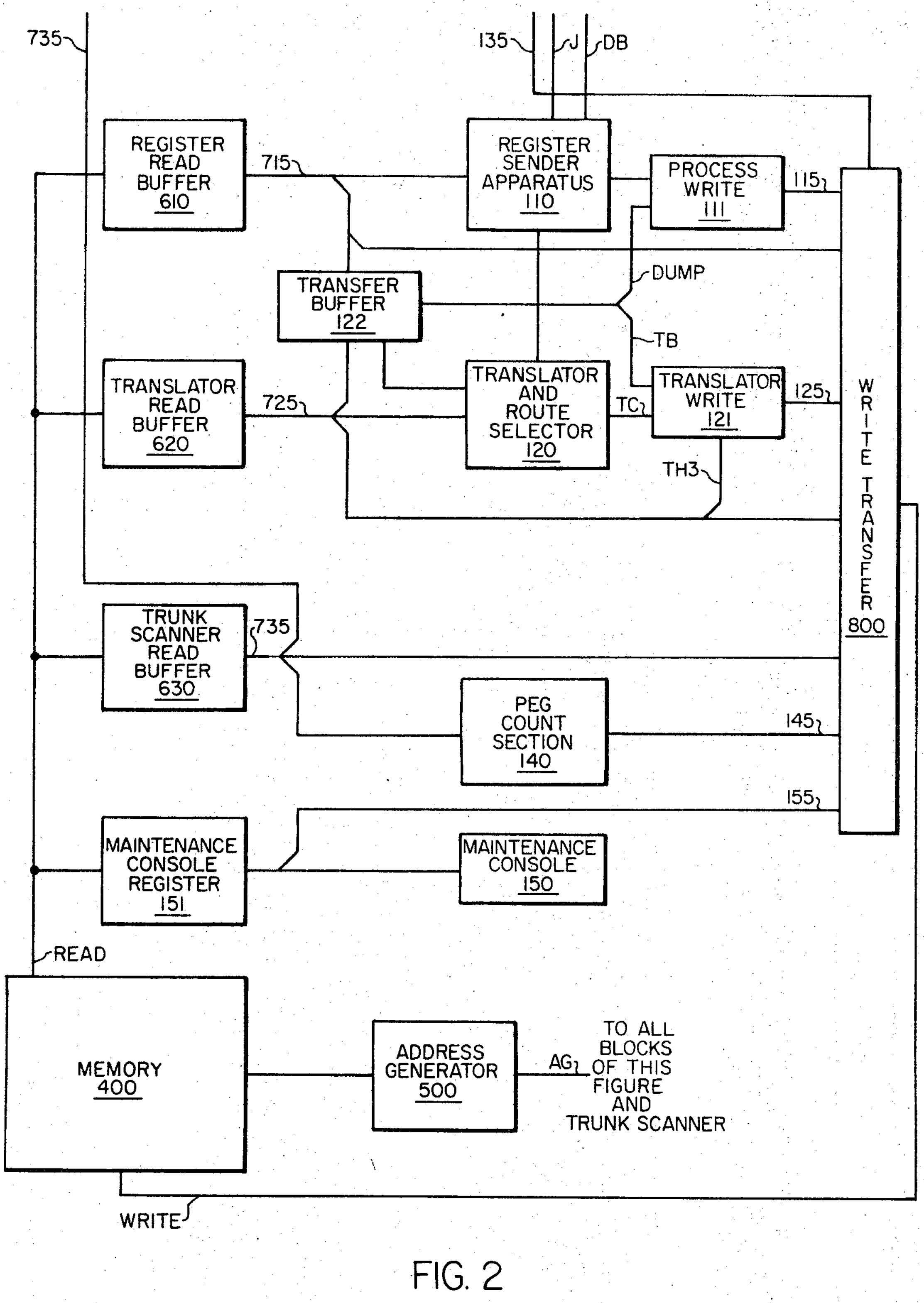

The communication switching network and termination equipment is shown in FIG. 1, and the common control equipment is shown in FIG. 2, except that the trunk scanner shown in FIG. 1 is part of the common control equipment. Referring to FIG. 1, the switch matrix 301 comprises a plurality of coordinate relay crosspoint matrices. The switch marker 302 is called into use during each call to find an available path through the switch matrix and to operate the crosspoint relays. The terminations of the switch matrix include a number of local line circuits LC00 to LC79, a number of interoffice trunk circuits TC00 to TC19, a number of dial assistance trunks D00 to D19, and register-sender junctor circuits J1 to J24. There are also a number of other terminations (not shown) for connection to branch exchanges, test trunks, announcement trunks, conference trunks, and tone trunks. The local line circuits are connected via respective line transmission units LT00 to LT79 to lines L00 to L79 serving four-wire subscriber stations S00 to S79. The interoffice trunk circuits are connected via trunk transmission units TT00 to TT19 to the trunk lines T00 to T19. The line and trunk transmission units may comprise carrier equipment or any other form of transmission equipment for transmission via radio or wire. The dial assistance switchboard group DAS is provided for supplying operator assistance.

The switch matrix termination circuits each include a number of relays including in each case a cutoff relay CO, and two connect relays AX and TS, of which only one set of contacts of each is shown. A common highway H comprises a plurality of common conductors extending from the switch marker 302 to the several matrix termination circuits. Details of the switch matrix and marker and the termination circuits are disclosed in the System patent.

Except for the register-sender junctors, each of the switch-matrix termination circuits includes a plurality of busy-idle contacts connected between two conductors extending to the trunk scanner 130; the relays themselves with other contacts being shown in the System patent. The relay contacts are shown in the form of an X, representing normally open contact sets. While the contacts are shown as being part of certain relays, they may actually be on relays controlled by the designated relays.

Each termination circuit of the switch matrix is assigned a four-digit equipment identification number, the four digits being designated respectively as group tens, group units, trunk tens, and trunk units. The first two digits identify a group designated by TG and the last two digits identify a trunk within a group designated by TK.

The equipment identification number is used by the switch marker 302 via the set of conductors H to identify and select the termination circuits, by the common control equipment in processing a call, and by the trunk scanner.

The common control equipment includes the apparatus shown in FIG. 2, and the trunk scanner 130 shown in FIG. 1. One subsystem comprises register-sender apparatus 110 along with a register read buffer 610 and process write control circuits 111. A second subsystem comprises a translator and route selector 120 along with a translator read buffer 620 and write control circuits 121; and also a transfer buffer 122 which provides for communication with the register-sender subsystem for certain functions. The trunk scanner 130 along with a trunk scanner read buffer 630 comprises another subsystem. A peg count section 140 also uses the trunk scanner read buffer 630 during time periods when the trunk scanner is not using it. There is also a maintenance console 150 along with a maintenance console register 151 which alternate the use of a memory access period with the trunk scanner read buffer 630.

All of the common control subsystems make use of the same memory assembly 400. This is a destructive-readout type ferrite-core memory of the word organized or linear select type. An address generator 500 supplies the signals for reading and writing the words in and out of the memory, and supplies appropriate timing signals to all of the blocks of the common control equipment.

Each word comprises forty-four cores, forty of which store call processing information, the other four being for parity. The processing information of a word is divided into ten groups designated positions A–J. Each position comprises four bits (binary digits) which may store one binary-coded-decimal or hexadecimal digit. In some cases digits may be coded with more or less than four bits, or with four bits that do not coincide with a position. In any coded digit, the least significant bit is on the *left* with a weight of one, and moving right each bit has a weight double that of the preceding one. As each word is addressed, information signals are supplied via the group of conductors READ to one of the read buffers or registers 610, 620, 630 or 151, depending on timing signals from the address generator 500, and stored in forty flip-flops in the selected buffer. After a period for processing, the information is written back into the same memory cores via the write transfer circuit 800 and conductors WRITE. Normally the information is rewritten exactly as it appears in the read buffer. However, all of the information in the register-sender part of the memory is regarded as temporary, and may be modified by signals from the process write circuits 111. Most of the information in the translation and the route selection sections is "permanent," and cannot be modified during normal call processing; one exception being the status section, which can be modified by signals from the translator write circuits 121 for a word in the translator read buffer 620, and by the trunk scanner 130 for a word in its read buffer 630.

Said Memory Sharing applications include functional block and schematic diagrams of the three read buffers, of the write transfer unit 800, of the memory 400, and of the address generator 500.

(A2) Operation of the system

To briefly explain the operation of the system, with emphasis on operation of the translator and route selector 120, assume that a call is originated at station S00. The call request is detected in the line circuit LC00 and and provides a signal over a conductor of the set of conductors H to the switch marker. The switch marker identifies the calling line circuit and supplies its line equipment number 2100 over a set of conductors DB to the register-sender apparatus 110. The register-sender apparatus selects an idle one of the register-sender junctors, then returns both the originating line equipment number 2100 and the register-terminal equipment number such as 9001 to the switch marker. The marker finds an idle path through the switch matrix between these two terminals and causes a four-wire connection to be established.

Class mark translation

During the time slot associated with the junctor, a service request signal is generated by the register-sender apparatus 110 and supplied to the translator and route selector 120.

Information including a translation instruction designating a class mark translation, and information identifying the originating equipment group and trunk numbers is then read via the register read buffer 610 into the transfer buffer 122. The translator, by means of comparison circuits, looks up certain information in its memory relating to the originating terminal, including various information relating to the services which may be offered, and loads it into the transfer buffer. The translator next finds a word in a status section of the memory, and via translator write circuit 121 and the wire transfer circuit 800 writes a bit into memory indicating that that termination circuit is originating a call.

Thereafter the translator dumps the information from the transfer buffer via conductors DUMP into the process write circuits 111 writing into the section of memory for the register junctor. The translator then resets to idle.

Dialing initiated

The register-sender apparatus, in accordance with the information received from the translator, prepares to receive dialing signals. For a four-wire local subscriber, a dual-tone multifrequency receiver is required which is connected via a switching matrix in the register-sender apparatus 110 to the junctor. Dial tone is sent to the originating line until the first digit is received. After the first digit is received, it is analyzed in the register-sender apparatus 110 to determine if it is a precedence digit; and if it is not, a routine precedence digit is assigned and stored. Thereafter the register-sender apparatus 110 requests the service of the translator for this junctor.

Precedence up-grade translation

The transfer buffer 122 loads, via the register read buffer 610, information from the junctor section of the memory, which includes a translation instruction designating a precedence up-grade translation, the originating equipment identity number, and the precedence digit.

The translator via translator write circuit 121 writes in the status section of the memory for that termination circuit the value designating the precedence for the call. Upon completion of the precedence up-grade translation, the translator is reset and returned to idle. The register-sender apparatus 110 next receives and stores in the junctor memory the first three digits keyed by the subscriber.

Code translations

After the three digits are accumulated, the register-sender apparatus again requests the translator, this time for a code translation. Information is supplied from the junctor section of the memory to the transfer buffer 122. This information includes translation instructions, the dialed digits, and the various class information for the calling line. The translator looks up these dialed digits in a code section of the memory and determines whether there are sufficient digits to route. If more digits are required, information is returned to the junctor section of the memory via the transfer buffer indicating how many digits are required for the call; and when the designated number of dialed digits are accumulated, the register-sender apparatus again requests the service of the translator for a code translation. When the translator has sufficient digits to route, this being either with the first three digits on the first code translation request, or with the required number of digits on the second code translation request, the translator obtains routing information from the code translation section of the memory. This routing information directs the translator and route selector 120 through various sections of the memory until the status section is reached, to search through a particular group of trunks to find one available for the call. Upon selection of the trunk, the precedence digit being used for the call is written into the status area for that trunk, thereby providing a busy indication for the trunk which prevents it from being selected for other calls of the same or lower precedence. However, the trunk may be pre-empted for calls of higher precedence.

The translator then steps to another word in the status section to obtain information which will be required for the sender. Information, including the equipment number of the selected terminating trunk and the sending information, is then returned via the transfer buffer to the junctor section of the memory.

Completion of the call

Assume that the interoffice trunk having equipment number 9900 has been selected. The register sender apparatus 110 via the set of conductors DB supplies to the switch marker 302 the equipment number of the sender for the junctor being used, and the terminating equipment number 9900. The switch marker 302 finds a path and establishes a connection from the sender to the trunk circuit TC00. Digits are generated and transmitted from the register-sender apparatus via a line in the set of lines J to the sender junctor, and transmitted through the switch matrix connection and the outgoing trunk circuit to the other office. After the completion of sending, information is supplied via the set of conductors DB to the switch marker to cause it to release the connections from the register and sender of the junctor, and to establish a direct connection through the switch matrix from the calling line circuit LC00 to the outgoing trunk circuit TC00. The register and sender junctors and the associated information in the junctor section of the memory are then returned to the idle state.

(B) MEMORY SECTIONS—ROUTE SELECTION

The translator-and-route-selector subsystem 120 uses a portion of the memory comprising nine functional sections, which are described generally in said System patent, sections 4.3.2 and 4.3.3, and are shown respectively in FIGS. 27 and 28 thereof.

Figure 3:
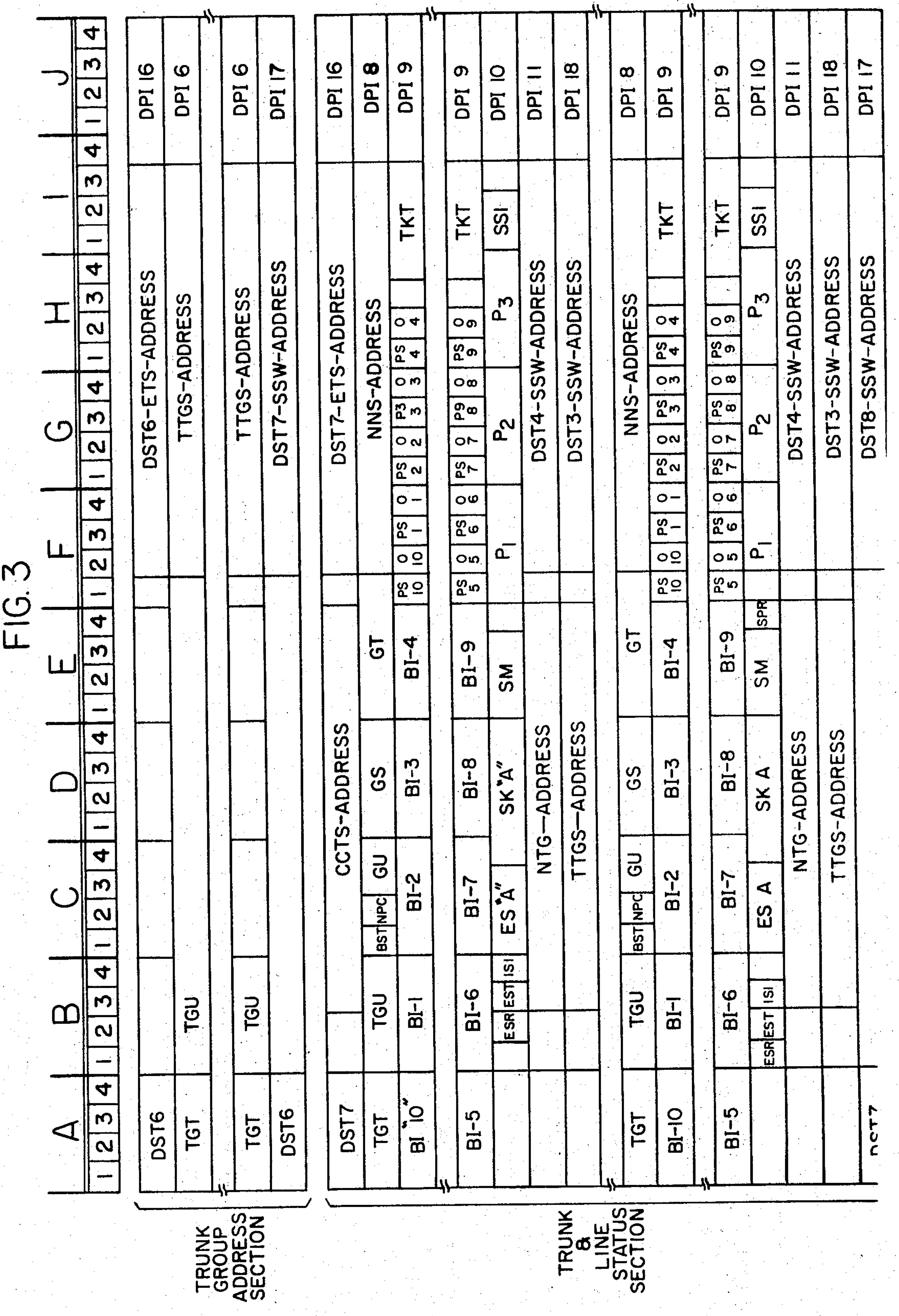
FIG. 3 is a diagram of the layout of the status portion of the memory, showing the type of information stored in each word.

The present invention relates to the trunk-and-line-status section 7 shown in FIG. 3 herein. The addresses required for entering this section appear in the trunk-group-address index section 6, also shown in FIG. 3.

In all of the translation and route selection words of the memory, the right-hand five bits I4–J4 comprise a process instruction which is decoded in the translator and route selector logic circuits 120 to control the interpretation of the remainder of the word and the processing thereof. The decoded processing instructions are designated by the initials DPI. The first and last words of each section have processing instructions DPI16 and DPI17 respectively. Position A of each of these section start and end words contains the section number, indicated on FIG. 3 by the initials DST. Several words of the memory store an address in bits F2–I3, and some words store an additional address in bits B3–E4. Each address comprises fourteen bits which are decoded as five digits A–E. The A digit comprises three bits with decoded values of 0–7, the B digit comprises two bits with decoded values 0–3, and the C, D and E digits each comprise three bits with decoded values of 1–6. In the sequence of addresses of the memory, the A digit varies most rapidly (least significant), with the B digit increasing by one when the A digit cycles from 7 to 0, the C digit advancing by one when the B digit cycles from 3 to 0, and the D and E digits advancing by one when the C and D digits cycle from 6 to 1 respectively. In the following description, decoded addresses will be given with the digits in EDCBA order.

In each DPI16 section start word, the address in bits F2–FI3 is the address of the last word of the section, indicated in FIG. 3 by the initials ETS. In section 7 the DPI16 is word also has a control-console-transfer start word address CCTS in bits B3–E4. In each end section DPI17 word, bits F2–I3 store the next section start word SSW address.

The trunk-group-address index section 6 contains a table of all of the trunk-group codes in use in the particular office. With each of these codes is stored the start-word memory address for its trunk-and-line status subsection. This address index section is provided so that the scanning of the memory will be limited, with the resulting saving in the call-processing time. Each of the words has a processing instruction DPI6. The trunk group tens TGT and trunk group units TGU are stored in positions A and B respectively, and the group-status start-word address is stored in bits F2–I3. Whenever the translator-and-route-selector subsystem 120 requires accessing the status section for a trunk in a particular group, it first scans the group tens and units digits in position A of section 6 of the memory until coincidence is found, and then transfers the start address from bits F2–I3 to the address generator.

The trunk-and-line status section is made up of subsections, each of which stores the status of each trunk or line in a trunk group. Each trunk group is composed of a start word DPI8, the actual trunk status words DPI9, a sending instruction word DPI10, and two address words DPI11 and DPI18.

Each trunk group start word DPI8 contains the tens and units identity of the trunk group in positions A and B respectively, a group usage digit GU in bits C3–4, a group status digit GS in position D, a group type digit GT in bits E1–F1, and a next sub-trunk group start word address NSS in bits F2–I3. This address is the address of the next sub-trunk group in a split-trunk group, or the address of the DPI10 word if it is not a split trunk group or the last sub-group in a split trunk group.

The GU digit designates whether data traffic, voice traffic, or both may be handled. The GS digit designates what type of traffic the trunks in the group may handle which are (1) available for all traffic, (2) busy to all traffic, (3) available for priority traffic originating, (4) busy to all outgoing traffic, (5) not pre-emptible, (6) not to be used for data, (7) available for priority traffic terminating, (8) available for routine traffic terminating, and values 9–15 unassigned. The GT digit designates the type of line or trunk such as local 4-wire line group, local 2-wire group, branch exchange group, "DSA" group, a particular type of conference terminal group, various types of test and tone trunk groups, announcement trunks, etc.

Following each trunk group start word DPI8, there are a number of trunk and line status words DPI9 which contain the actual busy-idle indicators for the trunks. Each DPI9 word stores the status of five trunks. The trunk tens number is stored in bits H4–I3, and bit H3 stores a "1" for the word having the status of the first half of the trunks 0–4, and "0" is stored in bit H3 for the word storing the status of the second half of the trunks 5–9. The units digit zero is indicated in FIG. 3 as "10."

Positions A–E store the busy-idle indicators BI of the five trunks respectively coded as follows:

BUSY-IDLE INDICATOR—BI

0–0000—originating
1–1000—flash (precedence)
2–0100—immediate (precedence)
3–1100—priority (precedence)
4–0010—routine (precedence)
5–8—unassigned
9–1001—queueing idle
10–0101—flash override (precedence)
11–1101—equipment not in service
12–0011—unassigned
13–1011—true idle
14–0111—maintenance busy
15–1111—not equipped Bits F1–H2 store preseize bits PS and originating bits 0 for the five trunks as indicated in FIG. 3.

The sending instruction word DPI10 contains various items of information which are necessary to supply to the register-sender apparatus 110 for outpulsing and other control functions when a trunk of this group is the terminating terminal on the switch matrix 301 for a call.

The first address word DPI11 contains the section 4 start word address SSW which is used by the translator to reaccess the route number section for alternate route attempts, and the next trunk group NTG address which is used by the scanner to advance from one trunk group to the next sequentially.

The second address word DPI18 contains the section 3 start word SSW address which is used by the translator to reaccess the route selection for alternate route attempts, and the start word address for this trunk group TTGS, which is used by the trunk scanner to go back to the start of this trunk group and update all queing idle trunks to true idle if no idle trunks were found on the first scan, and also may be used by the translator to access the beginning of the trunk group on a preempt sequence.

Typical coding of memory sections 6 and 7 for certain addresses is given in the following table. Those bits in the DPI9 words which may be modified during call processing are left blank in the table. The addresses in the first column of the table are in reverse order EDCBA so that the least significant digit appears on the right. The actual memory contents are in the ten columns A–J. The right-hand column gives the decoded process instruction DPI for convenience in using the tables.

SECTION 6.—TRUNK GROUP ADDRESS

| | Memory contents | | | | | | | | | | |
|---|---|---|---|---|---|---|---|---|---|---|---|
| | A | B | C | D | E | F | G | H | I | J | DPI |
| Address EDCBA: | | | | | | | | | | | |
| 16333 | 0110 | 0000 | 0000 | 0000 | 0000 | 0100 | 0010 | 1011 | 1000 | 0001 | 16 |
| — | — | — | — | — | — | — | — | — | — | — | 6 |
| 16336 | 0101 | 1010 | 0000 | 0000 | 0000 | 0101 | 1010 | 0001 | 1000 | 1100 | 6 |
| 16337 | 0101 | 0110 | 0000 | 0000 | 0000 | 0101 | 0110 | 0001 | 1000 | 1100 | 6 |
| — | — | — | — | — | — | — | — | — | — | — | 6 |
| 16451 | 0100 | 1000 | 0000 | 0000 | 0000 | 0110 | 1000 | 1001 | 1000 | 1100 | 6 |
| — | — | — | — | — | — | — | — | — | — | — | 6 |
| 16500 | 1001 | 1001 | 0000 | 0000 | 0000 | 0100 | 0101 | 0101 | 1000 | 1100 | 6 |
| 16501 | 0110 | 0000 | 0000 | 0000 | 0000 | 0000 | 0010 | 0001 | 1001 | 0001 | 17 |

SECTION 7.—TRUNK AND LINE STATUS

| | Memory contents | | | | | | | | | | |
|---|---|---|---|---|---|---|---|---|---|---|---|
| | A | B | C | D | E | F | G | H | I | J | DPI |
| Address EDCBA: | | | | | | | | | | | |
| 14100 | 1110 | 0000 | 0001 | 0001 | 0100 | 0100 | 1101 | 0101 | 1000 | 0001 | 16 |
| — | — | — | — | — | — | — | — | — | — | — | ------ |
| 14115 | 0101 | 1010 | 1011 | 1000 | 0010 | 0010 | 0110 | 0001 | 1000 | 0010 | 8 |
| 14116 | | | | | | | | 10 | 1011 | 0010 | 9 |
| — | — | — | — | — | — | — | — | — | — | — | 9 |
| 14121 | | | | | | | | 01 | 0001 | 0010 | 9 |
| 14122 | 0000 | 0000 | 1110 | 0000 | 0100 | 0000 | 0000 | 0000 | 0000 | 1010 | 10 |
| 14123 | 0000 | 0010 | 1011 | 0000 | 1100 | 0101 | 0110 | 1110 | 1001 | 1010 | 11 |
| 14124 | 0000 | 0010 | 1101 | 0000 | 1100 | 0010 | 1010 | 1110 | 1000 | 1001 | 18 |
| 14125 | 0101 | 0110 | 1011 | 1000 | 0010 | 0010 | 1110 | 0001 | 1000 | 0010 | 8 |
| — | — | — | — | — | — | — | — | — | — | — | — |
| 14413 | 0100 | 1000 | 1011 | 1000 | 1000 | 0010 | 1100 | 1001 | 1000 | 0010 | 8 |
| 14414 | | | | | | | | 10 | 1011 | 0010 | 9 |
| 14415 | | | | | | | | 01 | 1011 | 0010 | 9 |
| — | — | — | — | — | — | — | — | — | — | — | 9 |
| 14431 | | | | | | | | 01 | 1101 | 0010 | 9 |
| 14432 | 0000 | 0000 | 1110 | 0000 | 0100 | 0000 | 0000 | 0000 | 0000 | 1010 | 10 |
| 14433 | 0000 | 0010 | 1110 | 0100 | 1100 | 0101 | 0110 | 1110 | 1001 | 1010 | 11 |
| 14434 | 0000 | 0011 | 0100 | 0100 | 1100 | 0010 | 1010 | 1110 | 1000 | 1001 | 18 |
| — | — | — | — | — | — | — | — | — | — | — | — |
| 15221 | 1001 | 1001 | 1011 | 1000 | 0011 | 1011 | 0101 | 0101 | 1000 | 0010 | 8 |
| 15222 | | | | | | | | 10 | 1011 | 0010 | 9 |
| 15223 | | | | | | | | 01 | 0001 | 0010 | 9 |
| 15224 | | | | | | | | 11 | 0001 | 0010 | 9 |
| 15225 | | | | | | | | 01 | 0001 | 0010 | 9 |
| 15226 | 0000 | 0000 | 0000 | 0000 | 0011 | 0000 | 0000 | 0000 | 1000 | 1010 | 10 |
| 15227 | 0000 | 0000 | 0001 | 0000 | 1100 | 0101 | 0110 | 1110 | 1001 | 1010 | 11 |
| 15230 | 0000 | 0010 | 0010 | 1010 | 1100 | 0010 | 1010 | 1110 | 1000 | 1001 | 18 |
| 15231 | 1110 | 0000 | 0000 | 0000 | 0000 | 0001 | 1011 | 0110 | 0101 | 0001 | 17 |

(C) TRUNK SCANNER

The function of the trunk scanner is to indicate in section 7 of the memory when a trunk or line becomes idle. This is accomplished by scanning the busy-idle contacts of each trunk in each trunk group, a busy trunk being indicated by a closed circuit. The busy-idle contacts of all of the trunks are scanned at least once every two seconds to keep the trunk status section 7 of the memory up to date.

(C1) Equipment of the trunk scanner

The trunk scanner comprises a number of logic gates and flip-flops which are shown in FIG. 1 as comprising a group selection circuit 4, processing instruction circuit 5, a delay timer circuit 6, a trunk status circuit 7, and an address generator control circuit 8. These circuits are shown by functional block diagrams in FIGS. 4–8, respectively.

The group selection circuit (FIG. 4) includes a trunk group identity buffer comprising eight latch circuit TGT1, TGT2, TGT4, TGT8, TGU1, TGU2, TGU4 and TGU8, of which the first and last are shown. This identity is read from positions A and B of the DPI8 words of section 7 of the memory, via the trunk-scanner read buffer 630. The output of the latch circuits is decoded to 1-out-of-100, the outputs being the trunk group identities 00 to 99. These outputs have respective relay drivers with contacts to connect negative potential to one of the one hundred leads TG00 to TG99. As shown in FIG. 1 these leads are connected to one side of the busy-idle contacts in the line and trunk circuits of the corresponding groups, each lead being connected in multiple to all of the line or trunk circuits of the same group. For example, lead TG21 is connected to the busy-idle contacts of the line circuits LC00–LC79 which are in the local line group, lead TG99 is connected to the inter-office trunk circuits TC00–TC19, and lead TG05 is connected to the DAS trunk circuits D00–D19.

The outputs from the trunk scanner read buffer connect to a set of conductors 735 comprising the forty conductors SA1–SJ4 corresponding to the forty bits A1–J4 read from memory. The set of conductors TS comprises the outputs from the various circuits from the trunk scanner which are used as inputs to the other circuits thereof, and conductors to and from the address generator. The signals from the address generator are the pulse signals SCPB used as the AC input to flip-flops and gated pulse amplifiers, the timing signals designated with a TX, and the signal CI. The address generator signals are fully explained in said Memory Sharing applications.

The process instruction circuit 5 (FIG. 5) decodes the five bits SI4–SJ4 to provide the decoded signals for the process instructions occurring in words of section 7 of the memory. An S has been added to the output designations of this circuit to distinguish from the corresponding decoding circuit which is part of the translator and route selector 120.

Figure 4:
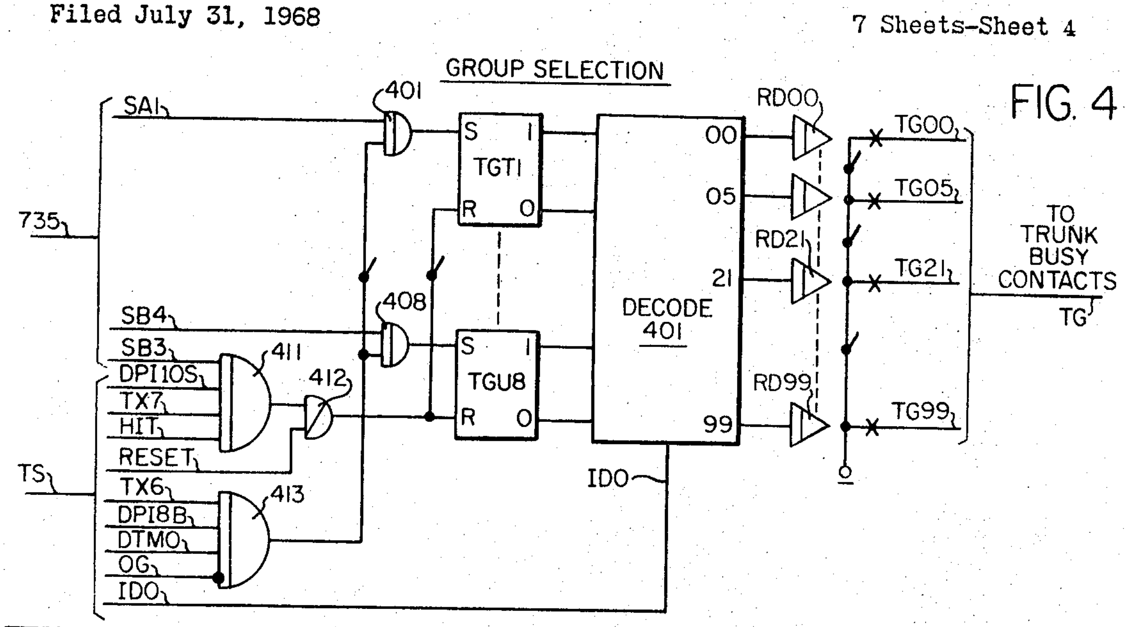
FIGS. 4–8 are functional block diagrams of the circuits of the trunk scanner.

The delay timer 6 (FIG. 6) comprises five flip-flops TM1, TM2, TM4, TM8 and TM16 along with logic circuits forming a 32-step binary counter shown as a block 601 with decoded outputs DTM0, DTM13, DTM29 and DTM31. The purpose of the timer is to allow time for a trunk-group-relay-driver contact (FIG. 4) to open or to close completely. The output DTM13 is used to make an open test, and the output DTM29 is used to make a closed test of the relay driver contacts by circuits not shown. The flip-flop IDO is used to inhibit the outputs of decoder 401 in the group selection circuits (FIG. 4).

The trunk status circuits 7 (FIG. 7) are used to read the status of the busy-idle contacts in the line and trunk circuits and to write the idle status into the corresponding status words of section 7 of the memory. The set of test conductors TK comprises up to one hundred conductors TK00 to TK99. As shown in FIG. 1 each of these test conductors is connected in multiple to the busy-idle contacts of not more than one trunk or line circuit in each trunk group. These test conductors are connected to individual detector gates of the trunk status circuit in FIG. 7.

The trunk tens digit is read from the status words of the memory as bits SH4–SI3, and is decoded in circuit 701 to a value of one-out-of-ten. Each of these decoded tens digits when true enables ten of the trunk status detector gates having the corresponding trunk tens digit. The outputs of these gates are connected to OR gates, there being ten OR gates 740–749 each having inputs from the ten status detector gates having the same trunk units digit. The outputs of these ten OR gates are taken via respective coincidence gates to inputs of five busy-idle buffer flip-flops BYA–BYE. The signals on SH3 when true enables the five gates supplying signals to the upper set inputs of the flip-flops, and when false enables gates supplying signals to the lower set inputs. A gated pulse amplifier 702 enables the AC inputs of the flip-flops at the beginning of each DPI9 word cycle, and gated pulse amplifier 703 resets them at the end of every word cycle.

There are five busy-idle decording circuits DBI 0/5 to DBI 4/9 to decode the busy-idle indicator values of the five memory positions A through E respectively. The values decoded are 9 for queueing idle, 11 for equipment not in service, 13 for true idle, and 15 for not equipped. These four outputs from each of the busy-idle decoding circuits for each position are connected to a corresponding one of OR gates 73A–73E, so that these values may be used to inhibit the trunk scanner signal from writing queueing idle into the trunk busy-idle indicator of the memory.

The write command controls comprise five AND gates, 71A–71E having outputs to leads WQIA to WQIE, five AND gates 72A–72E having outputs to leads ISF1 to ISHI, and five AND gates 74A–74E having outputs to leads WSA3 to WSE3. All fifteen of these gates are enabled by the signal on lead DPI9S for writing into the status words of section 7 of the memory. The five conductors WQIA to WQIE control writing the queueing idle value 1001 into the corresponding position of the memory, and also controls inhibiting the preseize bit for the same trunk. Each of the gates may be inhibited by the outputs from a corresponding one of OR gates 70A–70E. Each of these latter OR gates has four inputs, one from the corresponding busy-idle buffer flip-flop, one from the corresponding one of the preseize bit indicators SF1–SH1 from memory, another input from the output of the OR gate from the busy-idle decoding circuit for that position, and another input from the output of the flip-flop OG. Thus queueing idle can be written into the busy-idle indicator position of memory for a trunk only if all four of these conditions are false.

The five gates 72A–72E to the leads ISF1–ISH1 are used to inhibit the corresponding preseize bits for the five trunks in a word whenever the bit read from memory is true and the trunk becomes busy as indicated by the output of the corresponding busy-idle buffer flip-flop.

The five gates 74A–74E to the leads WSA3–WSE3 are used to change the status of all queueing idle trunks to true idle whenever the output of flip-flop OG is true. Writing a one in the single bit changes the code 1001 to 1011.

The latch HIT (have idle trunk) sets whenever the status of any trunk of a word read for memory is true idle. The latch OG (open gate) is set after the scan of a group if HIT is not true to enable writing the queueing idle status of all trunks in the group to true idle.

The address generator control circuit (FIG. 8) comprises three latches ESA, ASA and SMAA and an address carry buffer comprising fourteen flip-flops CYA1–CYE4. These circuits operate in conjuction with the address generator 500, which is described in said Memory Sharing applications.

The address generator 500, in summary, comprises a basic clock which produces two clock pulse trains CPA and CPB, each train consisting of pulses of one microsecond duration that occur at a 100 kilohertz rate, with two trains being displaced in time from one another by five microseconds. The train CPB is repeated to lead SCPB for use by the trunk scanner. A TX generator which is basically a sixteen-step ring counter produces a set of sixteen mutually exclusive ten-microsecond pulses, TX0 through TX15 which occur in numerical order. The TX generator is driven by the CPA pulse train causing each TX pulse to begin with the leading edge of one CPA pulse and to end with the leading edge of the following CPA pulse. A memory word time (cycle) comprises one cycle of the TX generator, which is 160 microseconds. The address generator 500 includes three separate sets of flip-flop counting circuits, for the register-sender subsystem, the translator-and-route-selector subsystems, and the trunk-scanner subsystem respectively. The address counters for the translator subsystem and the trunk-scanner subsystem each comprise fourteen flip-flops. The trunk-scanner subsystem reads a word from the memory 400 during the interval TX14 and transfers it into its read buffer 630 at the end of the interval TX15. The word remains available for processing in read buffer 630 during the intervals from TX0 to the middle of TX14. The word is rewritten into memory from the read buffer 630 during interval TX11 and the read buffer 630 is reset in the middle of the interval TX14. The address flip-flops for the trunk scanner and address generator 500 change from one address to another at the beginning of the interval TX12. When the flip-flop ESA (FIG. 8) is set this address is transferred from the carry buffer flip-flops CYA1–CYE4; and when the flip-flop ASA is set the address flip-flops in generator 500 advance sequentially to the next address.

The trunk-scanner subsystem and the maintenance console alternate memory word time cycles as determined by a flip-flop CI (not shown) in the address generator 500, the trunk scanner cycle being indicated by the signal CI not true. Also during the time that the trunk scanner is changing from one trunk group to another the peg count section 140 uses the word time cycle of the trunk scanner, which is controlled by the latch SMAA, scanner memory access allowed, which is in the set state while the trunk scanner is using the memory.

(C2) Operation of trunk scanner

The operation of the trunk scanner will be explained with reference to FIGS. 1–8 of the drawing and the table for section 7 of the memory in part B of this disclosure.

The operation is started by a manual start circuit (not shown) which produces a signal on conductor START to load a strapped field address into the trunk scanner read buffer 630, this being the address 14100 of the start word DPI16 of section 7. The signal START in coincidence with the timing signal TX6 via gates 804 and 813 (FIG. 8) also sets the enter-scanner-address latch ESA, and via gate 816 the scanner-memory-access-allowed latch SMAA. The gated pulse amplifier 801 enables the input coincidence gates of the carry buffer CYA1–CYE4 to load the address from the read buffer via leads SB3–SB4. The signal from latch ESA enables a circuit in the address generator 500 to load the address from the carry buffer into the trunk-scanner address flip-flops of the address generator.

Figure 5:
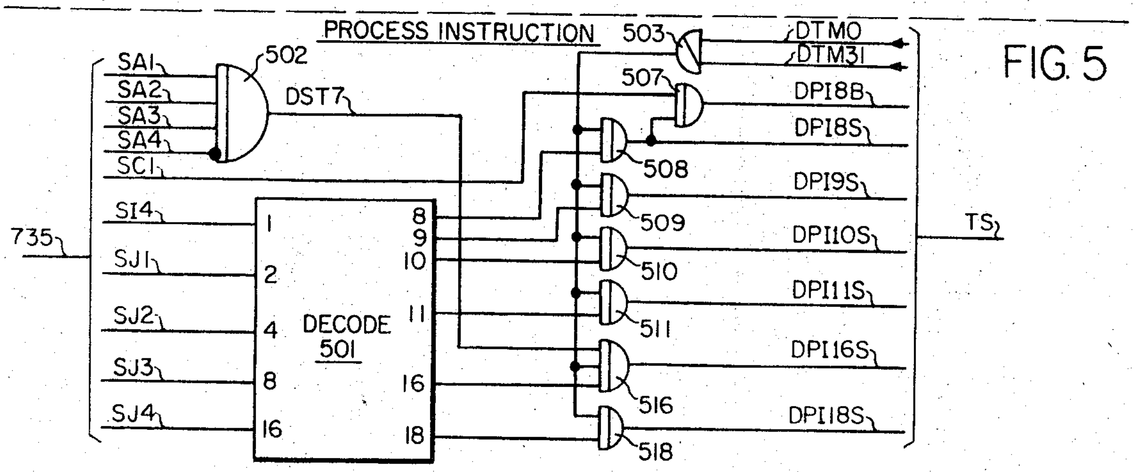

Upon reading the word at address 14100, the process instruction in the flip-flops SI4–SJ4 of the read buffer 630 is decoded by the circuit in FIG. 5, and the signal on lead DPI16S, via gates 806, 807 and 814 (FIG. 8) during the pulse TX7, sets the latch ASA, which advances the trunk scanner address one step in the address generator 500.

Figure 6:
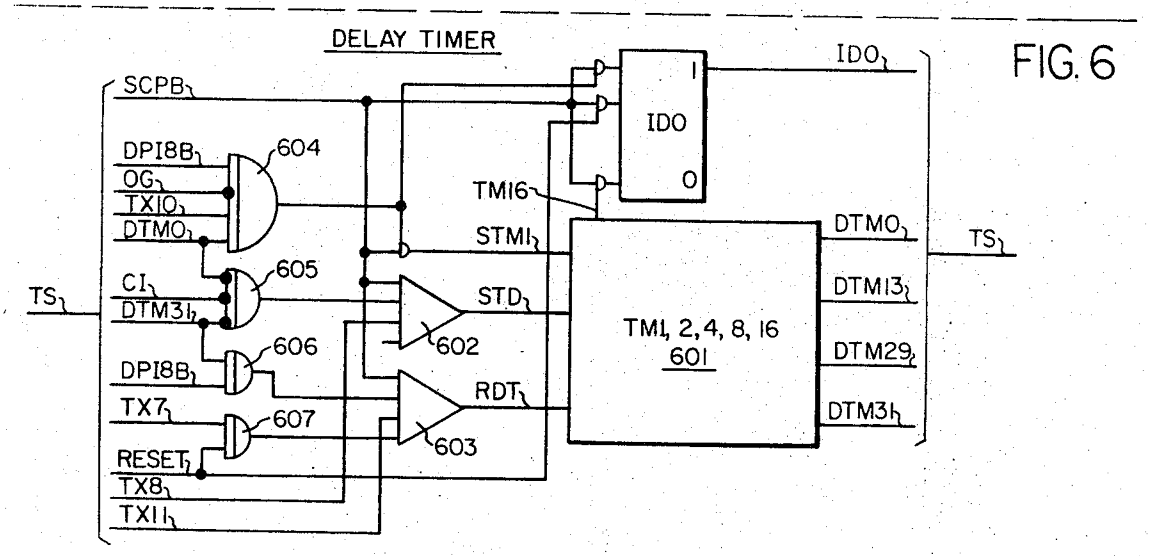
Figure 7:
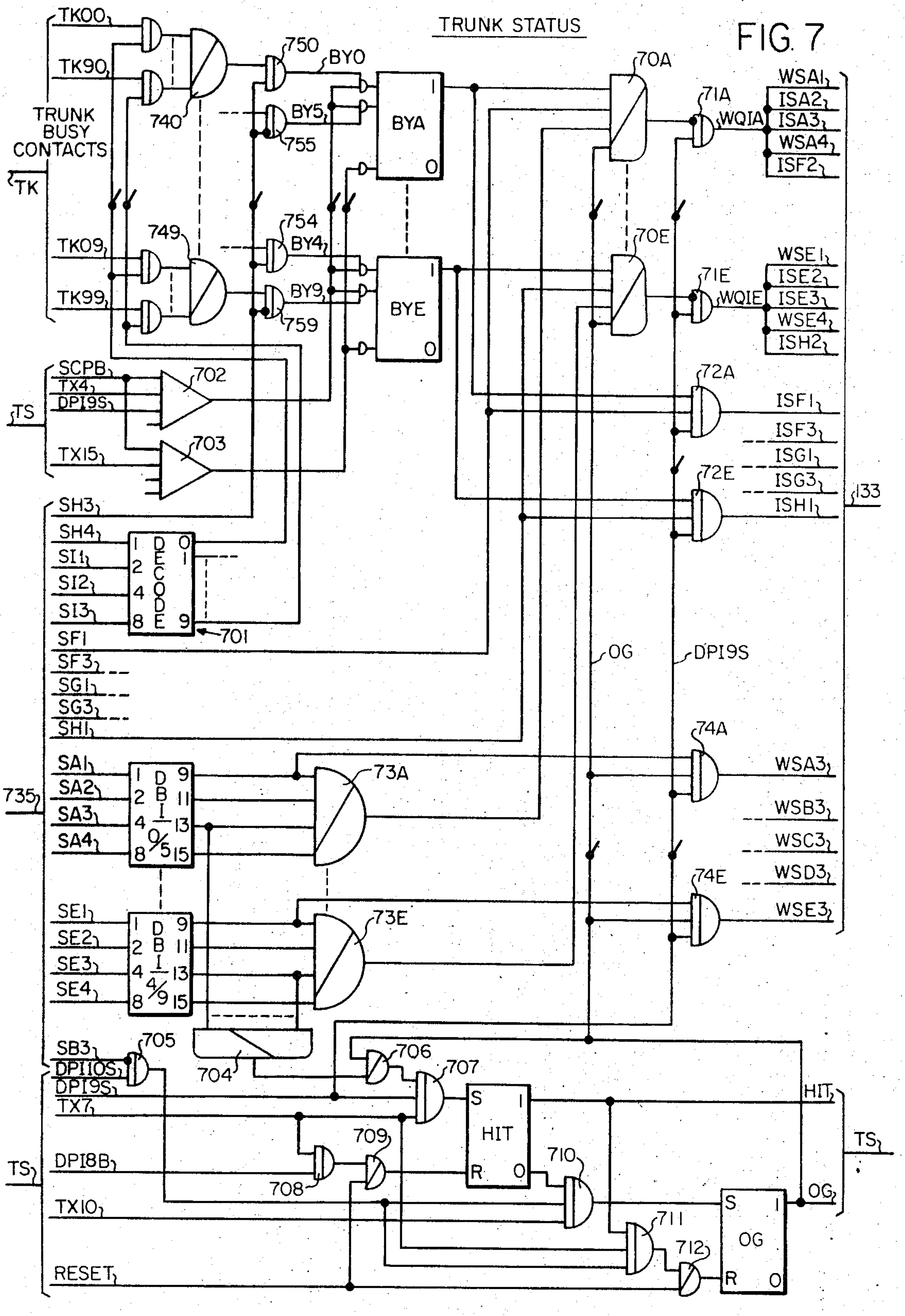

The next word read is a DPI8 word indicating the first word of a trunk group. The scanner scans successive trunk groups which have been omitted from the table in part B. The next address shown in the table is 14115. In this word the bit C1 is a "1," indicating that this is the first word of a trunk group. If the trunk group is split, preceding trunk groups will have a "0" stored in bit C1. The delay timer of FIG. 6 stops at position DTM31, so that via gate 503 the AND gates 508–518 all have a true signal at their upper inputs. This output "8" of the process instruction decoder 501 via gate 508 produces the signal DPI8S, and in coincidence with the signal on lead SC1 via gate 507, produces a signal on lead DPI8B. In FIG. 6, the output of gate 606 becomes true, and during interval TX11 the gated pulse amplifier 603, upon the occurrence of the clock pulse SCPB produces a pulse RDT to reset the delay timer counter 601 to position DTM0. The latch ASA is reset in interval TX13 of every cycle, so that the address generator remains at the same position. In the next cycle in the interval TX6, the input signals DPI8B and DTM0 are true and the signal OG is false, so that a true signal from gate 413 is applied to the lower inputs of gate 401–408 to gate the trunk group identity from the read buffer on leads SA1–SB4 into the latches TGT1–TGU8. As shown in the table, these signals have the value 0101 1010, which produces an output from decoder 410 having a value of 05. In interval TX10 the output from gate 604 becomes true to set the flip-flop IDO, which in decoder 401 inhibits the output. The output of gate 604 also enables the input coincidence gate which supplies a signal STM1 to set the flip-flop TM1, thereby setting the counter to a count of one. The output of gate 605 is true when all of the inputs are false, and since the signals DTM0 and DTM31 are both false at this time, this occurs in alternate cycles when the signal on lead CI is false. In these alternate cycles, the gated pulse amplifier 602 is enabled during the interval TX8 by the clock pulse SCPB, to produce a step-delay-timer signal SDT, so that the timer is advanced one step every other cycle. At step 16 the signal on lead TM16 becomes true to reset the flip-flop IDO. This removes the inhibiting signal from the decoder 401 so that the relay driver from outlet 05 becomes enabled to apply negative potential to lead TG05. The timer 601 stops at step 31, at which time the relay driver should be fully operated. The latch SMAA (FIG. 8) which is reset via gates 810, 817 and 818 whenever the signals DTM0 or DTM31 are not true, is set during interval TX12 via gate 811 and 816. Negative potential is now supplied via the lead TG05 to all of the DAS trunk circuits in group 05.

When the delay timer reaches the count of 31 and the group selection contacts have closed, the coincidence of signals DTM31 and DPI8S during interval TX7, via gates 808, 809, 807 and 814 sets the latch ASA, enabling the address generator 500 to advance. The signal DTM31 via gates 811 and 816, during interval TX12 also sets the latch SMAA. The word at address 14116 is read, which has a process instrutcion DPI9. This process instruction indicates a word in the body of the trunk-and-line-status section of the memory. As long as DPI9 words are read the address generator advances sequentially from word to word, with the latch ASA continuing to be set on each word by the singal DPI9S via gates 806, 807 and 814.

At address 14116, the bits H4–I3 have the value 0101, which has a weight of 10, and is decoded via circuit 701 as a trunk tens "0." This provides a true signal at the lower input of the ten detector gates TK00–TK09 whose outputs are connected to the upper inputs of the ten OR gates 740–749. As shown in FIG. 1, the lead TK00 is connected to the busy-idle contacts of termination circuit LC00, TC00 and D00. However, only the DAS trunk circuits in group 05, including circuit D00, have negative potential applied via lead TG05 to the group side of the busy-idle contacts. In the particular word read the bit H3 is a "1," so that the signal SH3 from the read buffer enables the gates 750–754 connected to the upper set inputs of the five flip-flops BYA–BYE. Therefore the status of the five trunks having the equipment numbers 0500–0504 are read into the five flip-flops BYA–BYE when the gated pulse amplifier 702 is enabled by the signal DPI9S during interval TX4 to pass the clock pulse SCPB to the AC inputs of the flip-flops. The busy-idle indicator values stored in positions A through E for the five trunks respectively are read and decoded by the decoding circuits DBI0/5-DBI4/9. Any trunk whose busy-idle indicator in memory has one of the busy values 0, 1, 2, 3, 4, 10 or 14 does not have any output from the corresponding decoder circuit. However, if it has one of the idle or not in use values, 9, 11, 13 or 15, it will have an output from the corresponding one of the OR gates 73A–73E. If any one of the five trunks has a true idle value of 13, it supplies a signal via gates 704, 706 and 707 to set the latch HIT during interval TX7. Once set, the latch HIT remains set until the DPI8 word is reached at the end of the group or subgroup, to record the fact that the scanner has found a true idle trunk in the group or subgroup. Assume that trunk D00 is true idle so that the flip-flop HIT is set. The value of 13 also via gates 73A and 70A inhibits the gate 71A. Those of the five trunks whose busy-idle contacts are closed and therefore have the corresponding ones of the flip-flops BYA–BYE set, via the respective ones of the gates 70A–70E, inhibit the corresponding ones of gates 71A–71E.

Any one of the five trunks which was busy on the preceding scan and is now idle will not have a true output either from the status flip-flop or from the busy-idle indicator as read from memory, and also its preseize bit will not be true. For such a trunk the corresponding ones of gates 71A–71E will be enabled to write queueing idle into the busy-idle indicator position thereof of the memory. For example, assume that the trunk having equipment number 0504 has its busy-idle contacts open so that flip-flop BYE is not set, and that the decoded busy-idle value read from position E of the memory has a value of "4," and that its preseized bit SH1 is false. The gate 71E is then enabled via the signal DPI9S to make the signal WQIE true, which in turn makes the signals WSE1 ISE2, ISE3 and WSE4 true to write the value 1001 into position E of the memory.

At the beginning of interval TX13 the scanner address generator is advanced to the next word, in interval TX13 the latch ASA is reset, in interval TX14 the scanner read buffer 630 is reset, and in interval TX15 the flip-flops BYA–BYE are reset.

The next two words read from memory are 14117 and 14120, which are DP19 words not shown in the table. The following DP19 word at address 14121 has a decoded value from circuit 701 of "1" and bit H3 is "0," which designates the five trunks in the group having equipment numbers 0515–0519. The last of these is the DAS trunk circuit D19 shown in FIG. 1. The detector gates in FIG. 7 and the inputs from leads TK10–TK19 (not shown) read the status of the busy-idle contacts of ten trunk circuits, and the five gates 755–759 are enabled by the signal on SH3 being false. The flip-flops BYA–BYE are controlled via their second set inputs to record the status of the five trunk circuits. The busy-idle values read from memory are decoded by the circuits DBI0/5-DBI4/9 as before. Any required values are written into the memory via the set of conductors 135 as before, and the address generator is advanced to the word 14122, which is a DPI10 word. The signal DPI10S via gates 806, 807 and 814 sets the latch ASA to advance to the next address 14123, which is a DPI11 word.

Figure 8:
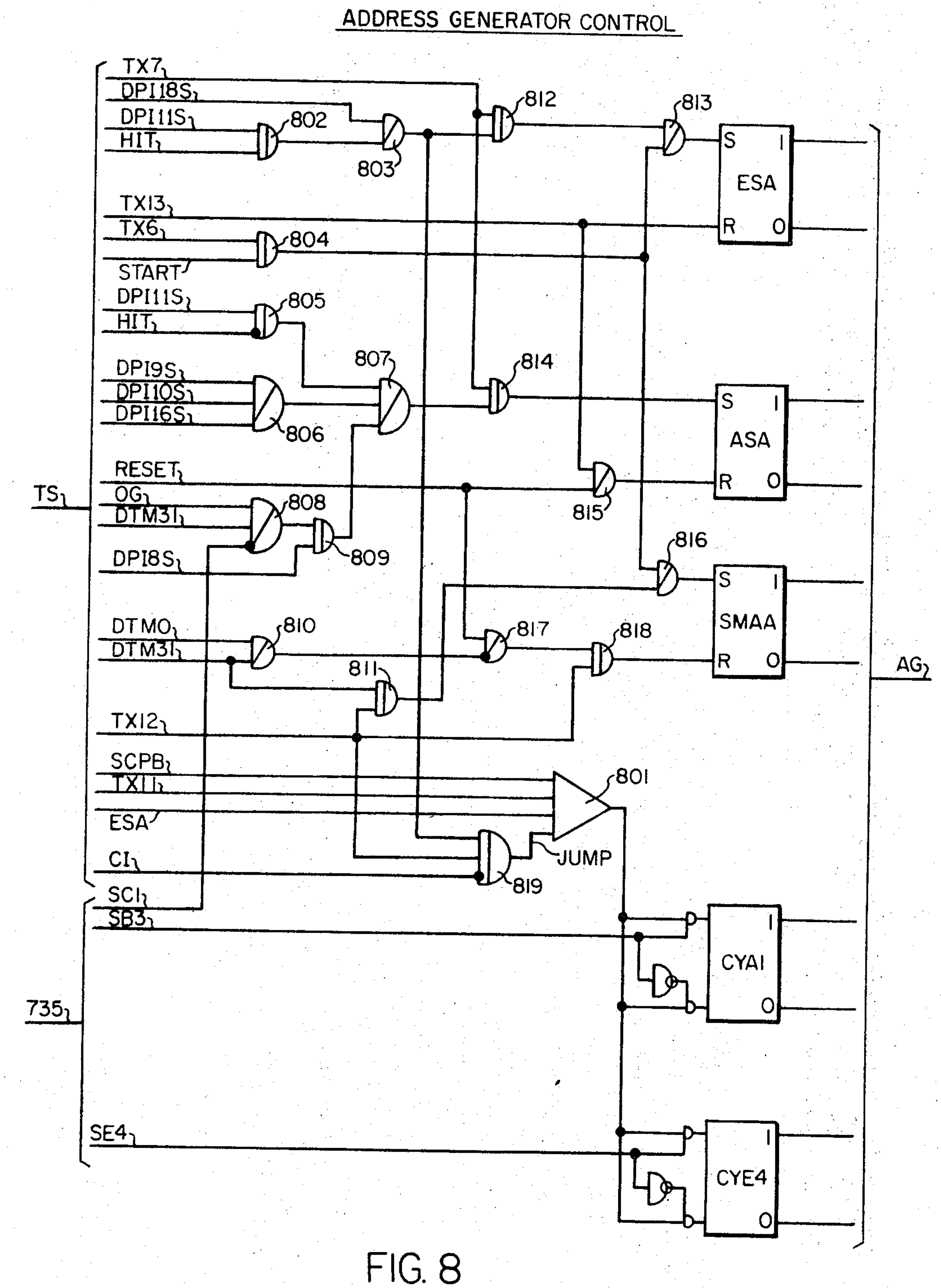

The DPI11 word indicates the last word of the trunk group status section. Since the latch HIT has been set, the jump address of the next trunk group is read from bits B3–E4. In FIG. 8, the signals DPI11S and HIT in interval TX7 via gates 802, 803, 812 and 813 set the latch ESA. The gated pulse amplifier 801 is enabled to load the address from the read buffer into the carry buffer flip-flops CYA1–CYE4. The address read is 101 01 100 001 100, which decoded and reversed has the value 14125. This is the address of the DPI8 word of the next trunk group. As shown in the table positions A and B, this is trunk group 06, and it is another DAS group, not shown in FIG. 1. The remainder of the addresses for this trunk group and several succeeding trunk groups are omitted from the table. Eventually the scanner reaches the address 14413. The trunk group number read from positions A and B, recorded in the latches TGT1–TGU8, and decoded by circuit 401 has a value of 21. The group type number in the bits E1–F1 is 10000, having a decoded value of "1" indicating a local 4-wire line group. The delay timer 601 is started, the relay driver contacts of the preceding group are released, and the relay driver RD21 operates to connect negative potential to lead TG21 to the line circuits LC00–LC79. When the timer reaches step 31 the latch ASA is set to advance the address generator to 14414.

The DPI9 status word of the local line circuits having equipment numbers 2100–2104 is read. Assume that line circuit LC00 is originating a call so that its status indicator is position A has the value 0000, and that the other four trunks are all idle as indicated by the state of their busy-idle contacts, and the value read from positions B–E of the memory is 9, indicating queueing idle. There has been no change in the values in memory, and the scanner continues to advance through the succeeding DPI9 words until it reaches 14431, which has a tens value read from bits H4–I3 and decoded by circuit 701 with a value of "7," while the bit H3 is zero, designating the trunks having equipment numbers 2174–2179. Assume that all of the trunks in this group 21 have been found to be either busy at the busy-idle contacts and having a busy value read from memory, or being idle at the busy-idle contacts and having a value of queueing idle 9 read from memory.

The address generator advances from 14431 to 14432, and then to 14433. At this time the latch HIT is still in the reset condition, so that gate 805 is enabled, and via gates 807 and 814 sets the latch ASA during interval TX7 to advance to the next word.

At address 14434, a DPI18 word is read. The signal DPI18S in interval TX7 via gates 903, 812 and 813 sets the latch ESA. The gated pulse amplifier 801 is enabled to read the address from bits B3–E4 into the carry buffer flip-flops CYA1–CYE4. This is address 110 10 001 001 100, which has a decoded and reversed value of 14413. This is the DPI8 word of the same trunk group 21.

With HIT in the reset condition at the end of the trunk group, the open gate latch OG was set during the DPI10 word 14432 via gates 705 and 710, the bit SB3 being false to indicate that no sub-trunk group follows.

When the DPI9 word at address 14414 is read it will again read from memory positions A–E the status of the trunks having equipment numbers 2100–2104. It has been assumed that the trunk 2100 is originating busy so that there is no output from the decoder DBI0/5, and that the other four trunks were queueing idle so that the other four decoders up to DBI4/9 read values of 9. The five gates 74A–74E all have true signals at their lower two inputs by the signals OG and DPI9S. At the upper inputs the gate 74A has a false signal while the other four gates have true signals for the queueing idle status. The outputs on the four leads WSB3–WSE3 are then all true to write ones in the corresponding bits, thereby changing the queueing idle status to true idle. The latch HIT is set via the signal from latch OG and gates 706 and 707 during interval TX7, the signal DPI9S being true.

The remaining DPI9 words of the group 21 are scanned in the same manner changing all queueing idle circuits to true idle. When the address generator reaches 14432, which is the DPI10 word, the latch OG is reset via gates 705, 711 and 712.

The address generator then steps to read the word 14433, which is the DPI11 word. With the latch HIT now set the scanner reads the address from bits B3–E4 into the carry buffer flip-flops CYA1–CYE4, which when decoded ind reversed has the value 14435. This is the address of the DPI8 word of a PBX trunk group 24, which is not shown in FIG. 1 or in the table.

The scanner continues to scan succeeding trunk groups until it reaches the address 15221, which is the DPA8 word of the inter-office group having group number 99. The scanner then proceeds to step through the next four addresses, which are the DPI9 words of this trunk group to read the status of the trunk circuits TC00–TC19 having equipment numbers 9900–9919. Assume that there are several true idle trunks in this group so that the flip-flop HIT is set. The scanner then steps through the DPI10 word 15226, to address 15227. The jump address read from bits B3–E4 into the carry buffer flip-flops CYA1–CYE4 has the value 0000 00 100 001 100, having the decoded and reversed value 14100, which is the DPI16 start word of section 7. The scanning process of all of the trunk groups is then repeated. A timer circuit, not shown in the drawing, may be incorporated in the trunk scanner so that a period of two seconds will elapse from the beginning of one scan of the trunk groups until the start of the next scan of them.

(D) TRANSLATOR WRITE

Figure 9:
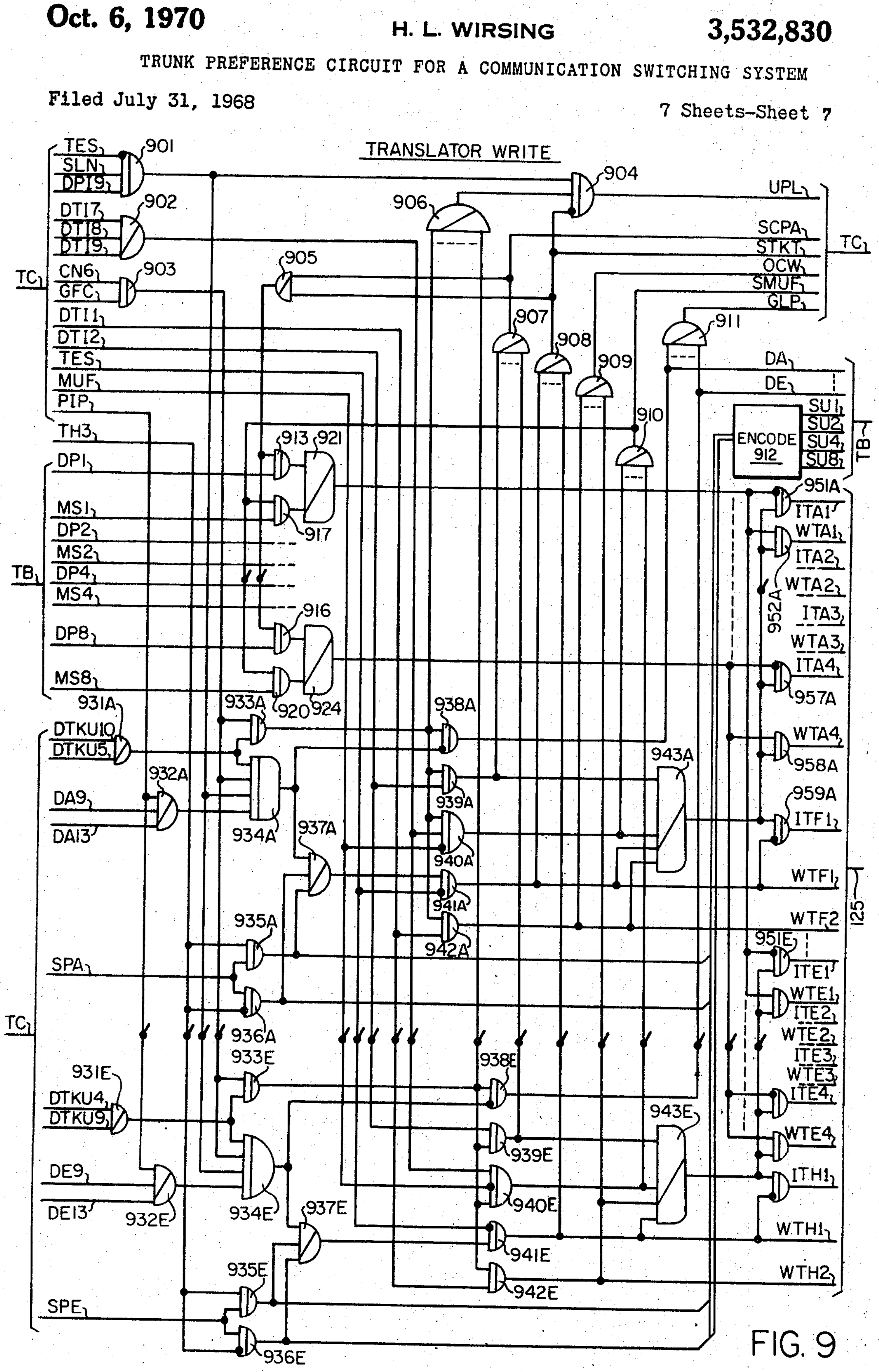
FIG. 9 is a functional block diagram of the translator write circuit of the route selector.

That portion of the translator write circuit 9 used to write into the DPI9 words of section 7 of the memory is shown in FIG. 9. This circuit supplies signals via the set of conductors 125 to inhibit or write into memory via the write transfer circuit 800. It also interfaces with the translator and route selector circuit 120 via the set of conductors TC, and with the transfer buffer 122 via the set of conductors TB. The signal leads from the transfer buffer comprise DP1, DP2, DP4 and DP8 from four flip-flops which store the precedence digit, and MS1, MS2, MS4 and MS8 from four flip-flops which store a marker status digit. The priority digit is one of the dialed digits normally received in the transfer buffer from the register-sender apparatus at the time a translation is requested. If no precedence digit has been dialed by the subscriber, the register-sender apparatus itself generates the value of four, designating routine precedence.

The signals received from the translator and route selector via the set of conductors TC includes TES—terminating equipment selected—which becomes true when the information through the terminating line or trunk circuit has been written into the DPI9 status word of the memory. The signal on lead SLN—select line next—designates that a particular line circuit being called is to be selected for the call. The signals CN6 and GFC relate to trunk tens coincidence when scanning the status section of the memory. The signal on lead MUF—maintenance up grade finished—becomes true when certain information has been written into a DPI9 word of memory. The signal on lead PIP—pre-empt in process—is true after all of the trunk circuits for terminating a call have been searched through by the translator and route selector without finding an indle one available, and pre-empt of a trunk circuit having a lower level of precedence is taking place. The signals on five leads SPA–SPE designate that the position corresponding to the last letter is to be selected during trunk hunting. The signals on ten leads DTKU10, DTKU1–DTKU9 are the decoded outputs of a set of four flip-flops designating the trunk units digit. The five signals on leads DA9–DE9, and the five signals onleads DA13–DE13, indicate the queuing idle and true idle status respectively of the five trunk busy-idle indicator positions in a DPI9 word.

The signal leads to the transfer buffer include five leads DA–DE used for a command to examine the data in the respective positions A–E on line selection and for preparation for pre-empt. The signals on the four leads SU1, SU2, SU4 and SU8, which are the coded outputs from encoder 912 designate the trunk units value of a line or trunk selected.

The signal leads to the translator and route selector 121 via conductors TC comprise UPL, the command to set an unable to pre-empt flip-flop upon the inability to pre-empt a line; SCPA a command to set translation complete at the end of the priority up grade translation; STKT, a command to transfer the trunk tens value upon trunk or line selection; OCW, a command indicating that an originating class mark translation has finished; SMUF, a command indicating maintenance up grade has finished; and GLP, a general gating command for line pre-empt.

(D1) Equipment of translator write circuit

As shown in FIG. 9, there are output leads from the translator write circuit, via the set of conductors 125 to the write transfer circuit 800 for writing into any one of the trunk busy-idle indicators in positions A–E, as well as for writing the preseize and originating bits F1–H2. The drawing shows four of the eight gates 951A–958A for writing into position A, along with gates 959A and 941A for inhibiting and writing respectively the preseize bit F1, and gate 942A for writing the originating bit F2; and the corresponding gates 951E–959E and 941E and 942E for writing into position E along with its preseize and originating bits H1 and H2; the gates for the trunks having positions B, C and D being omitted from the drawing. There are additional gates 931A–940A shown for controlling writing into position A, and 931E–940E for controlling writing in position E.

Gates 901–911 provide input and output control signals common to all positions, and gates 913–924 gate the digits from the transfer buffer to the output inhibit and write leads.

(D2) Translator write operation

The operation of the translator write circuits will be explained by reference to the typical call described in part A2, with a more detailed description of the translation process. The particular operation of the translator-and-route-selector circuits 120 is indicated by a translation instruction having decoded values indicated by DTI.

A class mark or service treatment translation is indicated by a translation instruction DTI1. During the class mark translation, after a line or trunk has been found in the line and trunk status section of the memory, the translator marks that trunk or line as originating busy by writing the value 0000 into the busy-idle indicator. The originating bit associated with that trunk or line position is also marked. The trunk or line cannot be pre-empted while the busy-idle indicator is equal to "0."

During the class mark translation, the translator and route selector looks up the translation instruction in one section of the memory, and in accordance with instructions found therein, it proceeds to other sections of the memory to look up class mark information relating to the particular line or trunk circuit and places it in the transfer buffer 122 after which it is directed to the address 16333 at the beginning of section 6 of the memory. The translator address is advanced sequentially through the DPI6 words examining positions A and B for coincidence with the trunk group number, which is 21. Coincidence is found at address 16451, and the trunk group start word address is read from bits F2–I3. This is address 110 10 001 001 100, which decoded and reversed is 14413. This address contains the DPI8 word at the beginning of trunk group 21 in section 7. The information in positions A and B is compared with the trunk group number to verify that the jump was to the proper word. The translator reads the group usage information from bits C3 and C4, which is 11, indicating voice or data; the group status from position D, which is 1000, indicating group available for all traffic; and the group type from bits E1–F1, which is 10000, indicating a local four-wire line group. The translator address than advances through the DPI9 words until trunk-tens coincidence is found in bits H4–I3. Since the trunk number is 0000, the tens value is given as "10" or binary 0101, which is found at address 14413.

The particular line is in the first of the two words for this trunk tens number, so the translator looks for the bit H3=1 which causes the signal GFC to become true. The signal CN6 is also now true. The trunk units number is decoded in the translator route selection circuit as DTKU10. Referring to FIG. 9, the signals CN6 and GFC via gate 903, and the signal DTKU10 via gate 931A, enables gate 933A. The translation instruction DTI1 along with the output of gate 933A enables gate 942A to write the originating bit via leads WTF2, and also via OR gate 943A to supply the signal to the gates 951A–959A. Since none of the gates 913–920 are enabled at this time, the signals from gates 921–924 are all false, so that the value 0000 is written into position A of the word at address 14414. The output of gate 942A also, via gate 909, supplies the signal OCW, which enables the translation complete signal to be generated in the translator-and-route-selector circuits. The class mark information is then supplied from the transfer buffer 122 via the leads DUMP and the process write circuit 111 into the register-sender section of the memory. The translator is then returned to idle.

PRECEDENCE UPGRADE TRANSLATION

This translation instruction for a precedence upgrade translation is DTI2. The information loaded from the register-sender apparatus into the transfer buffer 122 includes the precedence digit and the originating equipment identity number. The translator upon looking up the translation instruction goes at once to section 6 and looks up the originating group number which is at address 16451. The jump address is read which effects the transfer to the word at address 14413. The group number in positions A and B is again checked to determine if the translator jumped to the correct word. The address is then advanced through the following DPI9 words until it finds the trunk number at address 14414. The signals on lead CN6, GFC, and DTKU10 via gates 903, 931A and 933A provides a signal which along with the signal on lead DTI2 enables gate 939A, and via gate 943A enables the gates 951A–959A. The output of gate 939A also via gate 907 generates the signal on lead SCPA, the command to the translator indicating translation complete, at the end of priority upgrade translation. The output of gate 907 also via gate 905 enables gates 903–916 to gate the information from the four leads DP1, 2, 4, 8 via gates 921–924 to write the priority digit into position A of the memory.

CODE TRANSLATION

The translation instruction for code translations is DTI3. The address found upon lookup in the translation instruction section takes the translator to the beginning of the code translation section. The translator chooses a trunk group which may be used to reach the destination designated by the dialed digits, which has been assumed to be group 99. After performing certain preliminary operations, the translator jumps to the address 16333 at the beginning of section 6, and then steps sequentially through the DPI6 words until it finds coincidence in the A and B positions, which in this case occurs at address 16500. The address in that word from bits F2–I3 is read, and the translator jumps to the corresponding address 15221. Positions A and B are again compared to verify that the jump was correct. The translator reads the information from bits C3–F1, finding the group usage code for voice or data, the group status of available for all traffic, and the group type 00111 indicating an interswitch trunk group.

The translator then steps sequentially to the next word which is a DPI9 word containing the busy-idle indicators for the first five trunks of the group. The five memory positions A–E are decoded, with decoder outputs for the following value: 13, true idle; 19, queueing idle; 4, routine precedence; 3, priority precedence; 2, immediate precedence; and 1, routine precedence. The translator first hunts for a trunk having a value of 13 for true idle, searching through all of the DPI9 words of the selected trunk group and any other trunk groups which may be used for routing to the destination. If no true idle trunk is available it will then repeat this hunt looking for one which is queueing idle. If an idle trunk is still not found it will then repeat the hunt making the pre-empt-in-process signal PIP true, and look for a trunk having a lower precedence than that being used for the current call.

In this call we have assumed that trunk 00 in the group 99 is available at true idle. This is indicated by the signal SPA becoming true while reading the word at address 15222. In this word the bit H3 is also a "1," which is forwarded from the translator read buffer 620 to the translator write circuit. In FIG. 9, the signals SPA and TH3 enable the gate 935A, which via gates 937A and 941A writes the preseize bit WTF1. The output of gate 941A is also applied through gate 943A to enable the gates 951A–958A. The output of gate 941A via gate 908A provides a true signal on lead STKT, and via gate 905 enables the gates 913–916. This permits the precedence digit from the leads DP1, 2, 4, 8 to be applied through gates 921–924 and written via gates 951A–958A into position A of word 15222.

The command on leads STKT is used to read the trunk tens number which appears in bits I3–H3 of the selected word 15221. The units number is determined by applying the output of gate 935A to the encoder 912, and is supplied in binary code via the leads SU1, 2, 4, 8 to the transfer buffer. Thus the terminating trunk number 9900 is now available in the transfer buffer.

The signal on lead STKT is also used in the translator and route selecter 121 to make the signal TES true, which inhibits gate 941A. This signal in the translator and route selector indicates that the terminating equipment has been selected. The address generator continues to advance sequentially until the DPI10 word at the end of the trunk group is reached. There the sending instructions are read and loaded into the transfer buffer.

The translation is now complete and the information in the transfer buffer is supplied via conductors DUMP to the process write circuits 111 for loading into the register-sender section of the memory for further use in processing the call.

RELEASE TERMINATING EQUIPMENT TO QUEUEING IDLE

After a trunk is selected for termination by the translator and route selector, its preseize bit is marked by the translator. This is to prevent the trunk scanner from returning it to queueing idle before the switch marker 302 has made a connection. If the call is abandoned at the originating line after a terminating trunk has been preseized, but before the switch marker 302 has had a chance to make a connection, the register will initiate a translation with instruction DTI7. The translator is then seized, and it proceeds to find the line or trunk in the status section of the memory. The translator then writes queueing idle into the busy-idle indicator. In FIG. 9 the output of gate 902 in coincidence with the trunk number, for example from gate 931A via gate 933A, enables gate 940A. This signal via gate 943A enables the gates 951A–959A, and via gate 910 generates the signal SMUF, which enables the gates 917–920 to gate a digit from the transfer buffer on leads MF1, 2, 4, 8. The translator supplies the signal of value 9 via these leads which is written into the position A of the memory.

Translation instructions DTI8 and DTI9 are for trunks which become maintenance busy, and in a similar manner write a digit into memory from the transfer buffer via the leads MS1, 2, 4, 8.

What is claimed is:

1. In a communication switching system having a plurality of groups each comprising a plurality of termination circuits for use for calls;

a memory comprising a plurality of storage elements, including a status section having sets of storage elements individual to the termination circuits, each set having coded states indicating a busy status, a first idle status, or a second idle status, the second idle status being designated "true" idle to indicate preferred choice for selection, and the first idle status being designated "queuing" idle to indicate available for use when there are none "true" idle in a group;

memory access circuits including read means and write means to read and write respectively the status indications in said sets of elements;

a trunk scanner having connections to test conductors of said termination circuits, and scanner-memory-control circuits connected to said memory access circuits to control the read and write means to read the status indications from the sets of elements and to selectively write into the corresponding sets; each termination circuit having means to produce on a test conductor individual thereto a signal having a busy or idle indicating condition, which signal is supplied to the trunk scanner via said connections thereto; means in the trunk scanner to scan in repetitive cycles of said groups using the scanner-memory-control circuits to read the sets of elements in said status section while simultaneously receiving the signals via the test conductors from the corresponding termination circuits, and means responsive to an idle signal condition from a termination circuit at the same time that a busy status indication is read from the corresponding set of elements to use the scanner-memory-control circuits to write (via gates 70A–70E the first idle status in the set of elements; means in the trunk scanner effective during the first scan of each group in each cycle to record whether there is a set of elements of the group having the second idle status, and means responsive to no second-idle status being recorded for a group to repeat the scan of the group using the scanner-memory-control circuits to read the status of each circuit of the group, and for each set having the first idle status to write (via gates 74A–74E) the second idle status therein;

a route selector having route-selector-memory-control circuits connected to said memory access circuits to control the read and write means to read the status indications from the sets of elements and to selectively write into the corresponding sets, means in the route selector for selecting a termination circuit for a call using the route-selector-memory-control circuits to search through the sets of elements to find one set having the second idle status, to write the busy status in said one set, and to supply the identity of the corresponding termination circuit to other circuits of the system for seizing it for the call.

2. In a communication switching system, the combination as claimed in claim 1, wherein said route selector includes means, effective upon the completion of the search of the sets of elements of a given plurality of termination circuits for routing a call, without finding any having said second idle status, to repeat the search through the same sets of elements to select one having said first idle status.

3. In a communication switching system, the combination as claimed in claim 1, wherein said memory is organized into a plurality of words, each word comprising a plurality of storage elements having a single address for said memory access circuits, and wherein each word of said status section comprises the sets of storage elements for a given number (five) of said termination circuits;

and wherein said trunk scanner includes circuits (FIG. 7) for performing its said operations for all of the termination circuits of each word simultaneously.

4. In a communication switching system, the combination as claimed in claim 1 or 2, wherein said set of storage elements for each termination circuit includes a preseize marking element in which the route selector writes a "one" state upon selection of the termination circuit for a call to prevent the trunk scanner from writing an idle status in that set of elements until after the termination circuit is taken into use as indicated by the busy signal condition on its test conductor, the trunk scanner then writing a "zero" state in the preseize element;

and wherein the system includes means effective upon the abandonment of a call before a selected termination circuit is marked busy on its test conductor to supply an indication thereof to said route selector, and means in the route selector responsive to receipt of said indication of abandonment to change the status recorded in the set of elements of that termination circuit from busy to said first idle status and to reset the preseize element to its "zero" state.

5. In a communication switching system, the combination as claimed in claim 1 or 3, wherein said means to record whether there is a set of elements of the group having the second idle status comprises a bistable device (HIT) which is set responsive to detecting the second idle status from a set of elements, the trunk scanner further including another bistable device (OG) which is set responsive to the first said bistable device (HIT) not being set at the end of the scan of a group, and wherein said means to repeat the scan of the group is effective responsive to the first said bistable device (HIT) being not set at the end of the first scan of the group, and said second bistable device (OG) being in its set condition causes the trunk scanner to write the second idle status (via gates 74A–74E) for each set of elements having the first idle status.

No references cited.

KATHLEEN H. CLAFFY, Primary Examiner

T. W. BROWN, Assistant Examiner

U.S. Cl. X.R.

179—18